April 12, 1932.   T. H. BROWN ET AL   1,853,023
COTTON THINNING MACHINE
Filed Oct. 14, 1930
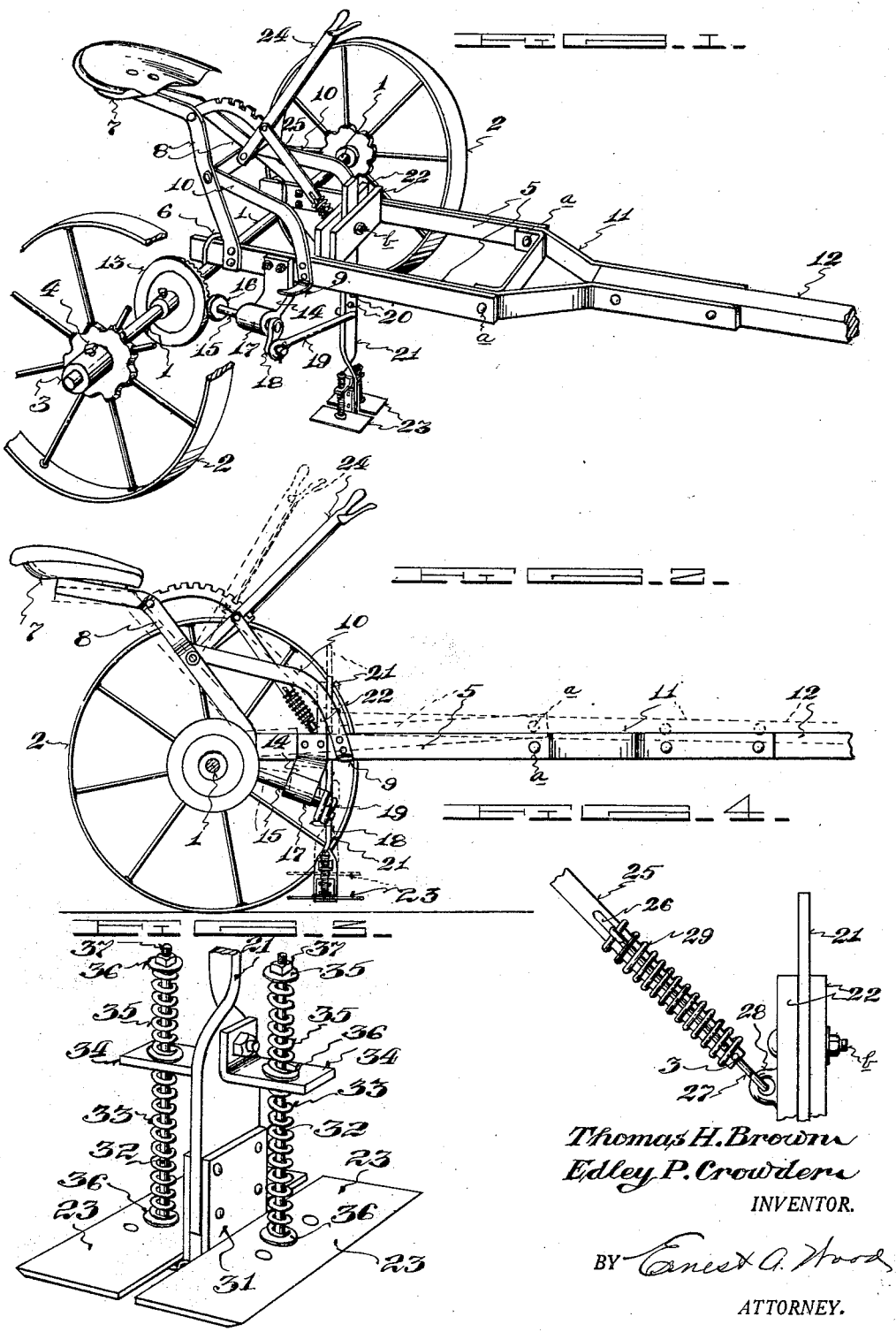
Thomas H. Brown
Edley P. Crowder
INVENTOR.
BY Ernest A. Wood
ATTORNEY.

Patented Apr. 12, 1932

1,853,023

UNITED STATES PATENT OFFICE

THOMAS H. BROWN AND EDLEY P. CROWDER, OF POTTSBORO, TEXAS

COTTON THINNING MACHINE

Application filed October 14, 1930. Serial No. 488,590.

This invention relates to agricultural implements and it has particular reference to cotton chopping and thinning machines, the principal object of which resides in the apparent simplicity, compactness and the very efficient manner by which it reduces the stand to the desired degree of uniformity and minimizes losses resulting from the presence of too many stalks in the stand, as well as cutting out foreign growth between the stalks constituting the stand.

Another object of the invention resides in a machine of the character specified having such few parts and consequently of such a simple nature that it may be crated and shipped at a very low cost and falls within the means of the most modestly situated farmer.

Still another object of the invention resides in the improved chopping element comprised of a pair of tensioned blades which yield to the earth when in operation.

With the foregoing objects as paramount, the invention has particular reference to its salient features of construction and arrangement of parts which will become manifest as the description proceeds, taken in connection with the accompanying drawings, wherein:—

Figure 1 is a perspective view of a cotton chopping machine constructed according to the present invention.

Figure 2 is a side elevational view of Figure 1.

Figure 3 is a detail view of the blade assembly of the chopping element, and

Figure 4 is a fragmentary view in detail showing the tensioning arrangement for the shank of the chopping element.

In continuing more in detail, 1 designates a straight axle, carrying upon its ends conventional wheels 2 which are affixed by means of a collar 3 having a set screw 4 passing therethrough and impinging the axle 1. A substantially U-shaped frame structure 5 has its inner ends fixed by U-bolts 6 to the said axle 1 and superimposed upon which is a seat 7 having braces 8 bolted to said frame 5. Foot rests 9 formed upon the ends of the members 10 are likewise affixed to frame 5 and extend upward and are connected to the seat supporting structure 8. The arrangement is obviously such that the weight of the operator, in view of the slight build of the machine will function to reduce the weight at the forward end of the frame 5, to which is connected at $a$ a yoke 11, the latter embracing a conventional tongue 12.

Upon the axle 1 is situated a beveled gear 13 and is adapted to rotate with the axle. A brace 14 is mounted upon the frame 5 and carries a short shaft 15, which shaft carries upon its end a small beveled gear 16 whose teeth engage the teeth of the large beveled gear 13. The short shaft 15 is mounted to revolve in a bearing 17 which is supported by the brace 14, as apparent in the Figures 1 and 2 and which bearing may be either babbitted or provided with rollers or balls so as to minimize friction at this point. At any rate, the short shaft 15 is held against endwise displacement.

Carried upon the opposite end of the shaft 15 is a crank arm 18 to the outer end of which is pivotally connected a pitman 19. The opposite end of the pitman 19 connected in one of a series of holes 20 vertically alined in the shank 21 of the cutting element, which will be later explained.

The shank 21 is pivotally mounted at $b$ between two lateral bars 22, situated between the parallel portions of the frame 5 and held in fixed position. Accordingly, when the wheels 2 revolve, such motion is imparted to the large beveled gear 13 to rotate the small gear 16, the short shaft 15 and the crank arm 18, and in so doing a reciprocative action is imparted to the hoe or cutting element shank 21 through the medium of the pitman rod 19. This action swings the cutting elements 23 to and fro across the path of the machine as it traverses a row of cotton or other vegetation.

In order that the cutting elements 23 may be raised to inoperative position, such as shown in dotted lines in Figure 2, a lever 24 is provided to be accessible to the operator and has connection to the transverse bars 22, through the medium of the arrangement shown in Figure 4 and which comprises an arm 25 having a longitudinal slot 26 through which extends a rod 27 and is connected pivotally to the eye 28, fixed to the lateral cross bars 22. The opposite end of the rod 27 embraces the upper end of a compressor spring 29, the lower end of the said spring being connected to the arm 25 near its lower end at 30. This arrangement affords the desired amount of flexibility in raising and lowering the cutting elements 23 and it is obvious that when a pull is imparted upon the lever 24, the frame, which is comprised of parallel bars, each capable of relative displacement and accordingly break at the pivot point a, thereby elevating that portion of the structure, mounted on the inside of the frame 5, namely; the lateral cross bar 22 and the reciprocating shank 21. This action however lowers the seat 7 and its mounting, by reason of the fact that it is connected to that portion of the frame 5 which is not directly connected to the elements which it is desired to move when drawing the cutting elements 23 from operative position. The dotted lines in Figure 2 are fully illustrative of the displacement which takes place upon actuation of the lever 24. When the lever 24 is moved, the spring 29, by reason of its inter-position between the moving parts 25 and 27 collapses, thereby obtaining the desired tension and resiliency.

With further reference to the frame 5, in order to clarify the foregoing statement, it is pointed out that the outer bars of the frame lie normally parallel with the inner bars thereof, which are shorter and between the ends of which is situated the transverse bar 22.

It has been stated that the pivot point is at a, therefore when the lever 24 is pulled forward, this action raises the inner ends of the inner bars constituting the frame, breaking the assembly at a and while the outer bars, yoke 11 and tongue 12 remain normally on a horizontal plane, the action in raising the cutting elements 23 is likely to slightly displace the seat, and the parts mentioned.

Referring now particularly to the cutting or chopping elements 23, these elements consists of a pair of parallel blades, as shown in Figure 3, having their edges sharpened and are relatively displaceable through the medium of hinges 31 and vertically disposed rods 32, loosely connected to the blades 23 and surrounded by springs 33. Perforated brackets 34 are affixed to the shank 21 and the rods 32 are slidably received in said apertures and extend well above the brackets 34 and springs 35 surround the upper ends of the rods. Washers 36 are provided against which the springs rest and nuts 37 are threaded upon the upper ends of the rods. Obviously, by turning the nuts 37, tension upon the springs 35 increases and decreases to raise and lower the blades 23 relatively.

Since the operation of the machine has been briefly mentioned in the foregoing and in view of the simplicity thereof, it is not considered necessary to enter into a lengthy description other than to mention that as the machine is moved along the row of vegetation, the shank 21 swings to and fro across the row, the extent of such movement being determined by the ratio of gearing, the adjustment of the pitman 19 in the holes 20 of the shank 21 and such other adjustments as may be found to be practicable in operation.

When the improved machine embodying the invention is stored or packed for shipping, the wheels 2 may be removed and the frame 5 collapsed upon the tongue 12 which forms a very compact arrangement which may be moved from place to place with little loss and occupying little space.

Manifestly, the construction shown is capable of considerable modification and such modification as is considered within the scope and meaning of the appended claims is also considered within the spirit and intent of the invention.

What is claimed is:

1. In a hoeing machine, a cylindrical frame, draft means pivoted to one end of said frame whereby to enable the latter to be movable in a vertical plane, a depending hoe carrying element suspended from said frame and capable of lateral swinging motion relative to said frame, means for imparting swinging motion to said hoe carrying element and compressively resilient means for maintaining operative position of said frame and hoe carrying element.

2. In a hoeing machine, a substantially rectangular frame mounted upon a wheeled axle at one end whereby its opposite end may be capable of upward and downward movement, means for yieldingly resisting upward movement of said frame, a hoe carrying element suspended from said frame and capable of swinging motion, means for imparting swinging motion to said hoe carrying element and means for raising and lowering said frame.

In testimony whereof we affix our signatures.

THOMAS H. BROWN.
EDLEY P. CROWDER.